US011460375B2

(12) United States Patent
Yamashita

(10) Patent No.: US 11,460,375 B2
(45) Date of Patent: Oct. 4, 2022

(54) ENGINE APPARATUS AND NOISE DETECTION SYSTEM

(71) Applicant: TOYOTA JIDOSHA KABUSHIKI KAISHA, Aichi-ken (JP)

(72) Inventor: Yoshiya Yamashita, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/158,010

(22) Filed: Jan. 26, 2021

(65) Prior Publication Data

US 2021/0278317 A1 Sep. 9, 2021

(30) Foreign Application Priority Data

Mar. 3, 2020 (JP) ............................ JP2020-035615

(51) Int. Cl.
*G01M 15/06* (2006.01)
*F02D 41/00* (2006.01)

(52) U.S. Cl.
CPC .......... *G01M 15/06* (2013.01); *F02D 41/009* (2013.01); *F02D 2200/101* (2013.01)

(58) Field of Classification Search
CPC . G01M 15/06; F02D 41/009; F02D 2200/101
See application file for complete search history.

(56) References Cited

U.S. PATENT DOCUMENTS 7,909,585 B2 * 3/2011 Clancy .................. F04B 39/123 417/313
9,477,895 B2 * 10/2016 Hershey ............... G06K 9/6292
10,107,278 B2 * 10/2018 Chou ...................... F04B 39/12
2012/0134504 A1 * 5/2012 Napoletano ............ G10K 15/02 381/61
2018/0163711 A1 * 6/2018 Follmar .................. F04B 49/06

FOREIGN PATENT DOCUMENTS

JP 2016164405 A 9/2016

* cited by examiner

*Primary Examiner* — Gonzalo Laguarda
(74) *Attorney, Agent, or Firm* — Hauptman Ham, LLP

(57) ABSTRACT

A specific sound having a higher frequency than an operation sound of an engine is generated in synchronization with timing of a top dead center of a specific cylinder of the engine. Thus, timing of a noise of the engine is estimated by using, for example, a deviation in time between timing of generation of a specific sound and timing at which a noise occurs in the engine, based on a sound collected from around the engine without directly using a signal of a crank angle of the engine.

3 Claims, 2 Drawing Sheets

10
20
30
50
NOISE DETECTION ECU
22
52
40
23
34
ENGINE ECU

ENGINE APPARATUS AND NOISE DETECTION SYSTEM

CROSS-REFERENCE TO RELATED APPLICATION

This application claims priority to Japanese Patent Application No. 2020-035615 filed on Mar. 3, 2020, incorporated herein by reference in its entirety.

BACKGROUND

1. Technical Field

The present disclosure relates to an engine apparatus and a noise detection system.

2. Description of Related Art

Hitherto, as a technique of this type, a knocking level evaluation system has been proposed (see, for example, Japanese Unexamined Patent Application Publication No. 2016-164405 (JP 2016-164405 A)). The knocking level evaluation system includes a sound pressure detector that detects a sound produced by an internal combustion engine, an angle detector that detects a rotation angle of a crankshaft of the internal combustion engine, and a knocking level detection apparatus that performs sensory evaluations of an abnormal sound pressure. In this evaluation system, the sensory level of a noise is quantified based on sound pressure data obtained by synthesizing a sound pressure signal from the sound pressure detector with an angle signal from the angle detector.

SUMMARY

In the above-described knocking level evaluation system, sound pressure data obtained by synthesizing a sound pressure signal with an angle signal needs to be generated. However, it is also desired to devise a technology for estimating the timing of a noise of an engine with a technique other than a technique for generating sound pressure data, for example, a technique not directly using an angle signal.

The present disclosure provides an engine apparatus and a noise detection system capable of estimating the timing of a noise of an engine without directly using a signal of a crank angle of the engine.

Some aspects of the engine apparatus and the noise detection system of the present disclosure are configured as follows.

An engine apparatus according to an aspect of the present disclosure includes an engine, and a specific sound generator configured to generate a specific sound having a higher frequency than an operation sound of the engine in synchronization with timing of a top dead center of a specific cylinder of the engine.

With the engine apparatus of the aspect of the present disclosure, a specific sound having a higher frequency than an operation sound of the engine is generated in synchronization with timing of a top dead center of a specific cylinder of the engine. Thus, timing of a noise of the engine is estimated by using, for example, a deviation in time between timing of generation of a specific sound and timing at which a noise occurs in the engine, based on a sound collected from around the engine without directly using a signal of a crank angle of the engine.

In the engine apparatus according to the aspect of the present disclosure, the specific sound may be a sound having a higher frequency than an audible frequency range. With this configuration, it is possible to reduce a situation in which a specific sound makes a user (for example, a driver, a worker, or the like) of the engine feel uncomfortable.

The engine apparatus according to the aspect of the present disclosure may further include a crank angle sensor configured to detect a crank angle of the engine. The specific sound generator may be configured to estimate the timing of the top dead center of the specific cylinder based on the detected crank angle. The specific sound generator may be configured to generate the specific sound in synchronization with the timing of the top dead center of the specific cylinder. With this configuration, it is possible to appropriately set timing of generating a specific sound.

In a noise detection system including the engine apparatus according to the aspect of the present disclosure, the engine may be accommodated in an engine compartment of a vehicle, the specific sound generator may be disposed in the engine compartment or attached to a wall part of the engine compartment, and the noise detection system may further include a sound collector configured to collect a sound in the engine compartment, and an estimator configured to estimate presence or absence and timing of generation of a noise based on the sound collected by the sound collector.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

An embodiment of the present disclosure will be described.

Figure 1:
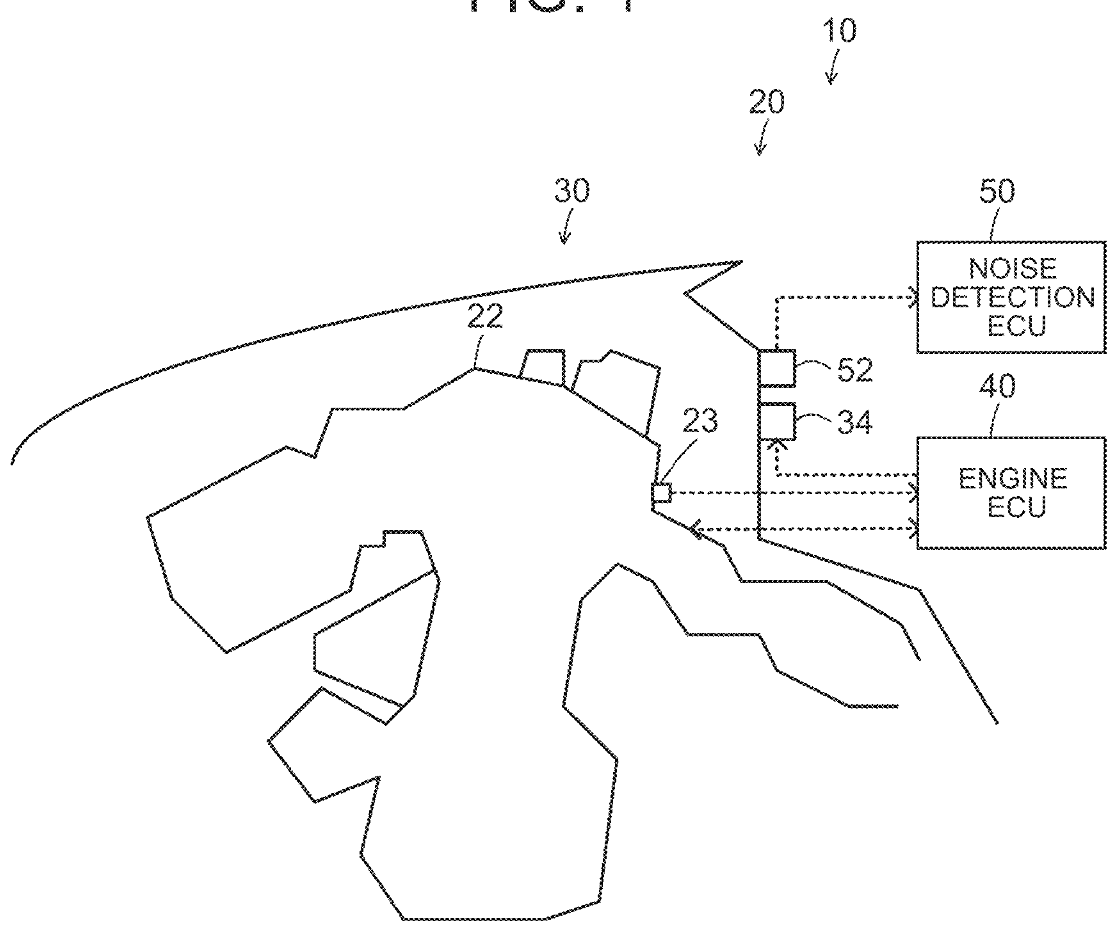
FIG. 1 is a configuration diagram schematically showing the configuration of a noise detection system including an engine apparatus as an embodiment of the present disclosure.

FIG. 1 is a configuration diagram schematically showing the configuration of a noise detection system 10 including an engine apparatus 20 as the embodiment of the present disclosure. The engine apparatus 20 of the embodiment is mounted on general automobiles and various hybrid automobiles. As shown in FIG. 1, the engine apparatus 20 includes an engine 22, an engine compartment 30, an engine electronic control unit (hereinafter, referred to as engine ECU) 40, and a noise detection electronic control unit (hereinafter, referred to as noise detection ECU) 50.

The engine 22 is an internal combustion engine that outputs power by using gasoline, light oil, or the like as fuel. Although not shown in the drawing, the engine 22 takes air cleaned by an air cleaner into an intake pipe and causes the air to pass through a throttle valve and a surge tank, and injects fuel from a fuel injection valve on a downstream side of the surge tank in the intake pipe to mix the air with the fuel. The engine 22 then takes the air-fuel mixture into a combustion chamber via an intake valve and causes the taken-in air-fuel mixture to undergo explosive combustion by using electric spark from an ignition plug. A reciprocating motion of a piston pushed downward by the energy of the explosive combustion is converted to a rotating motion of a crankshaft. The operation of the engine 22 is controlled by the engine ECU 40.

The engine compartment 30 is defined by an engine hood, an engine cowl, or the like. The engine 22 is placed in the engine compartment 30. In the case of hybrid automobiles, a motor, an inverter for driving the motor, and the like may also be placed in the engine compartment 30. A speaker 34 and a sound sensor 52 are attached to the wall part of the engine compartment 30. The sound sensor 52 detects the frequency of acoustic waves in the engine compartment 30 as a detected sound Ser. The speaker 34 is configured to be capable of generating a specific sound (for example, a pulsed sound) Sp having a higher frequency than an audible frequency range (for example, higher than or equal to 20000 Hz).

Although not shown in the drawing, the engine ECU 40 is configured as a microprocessor that mainly includes a CPU and that, in addition to the CPU, further includes ROM that stores process programs, RAM that temporarily stores data, input and output ports, and a communication port.

Signals required to control the operation of the engine 22 are input from various sensors to the engine ECU 40 via the input port. Examples of signals that are input to the engine ECU 40 include a crank angle θcr from a crank position sensor 23 that detects the rotation position of the crankshaft (not shown) of the engine 22.

Various control signals for controlling the operation of the engine 22 are output from the engine ECU 40 via the output port. Examples of signals that are output from the engine ECU 40 include a drive control signal to a throttle motor that adjusts the position of the throttle valve (not shown), a drive control signal to the fuel injection valve (not shown), and a control signal to the ignition plug (not shown). Examples of signals may also include a control signal to the speaker 34.

The engine ECU 40 computes the rotation speed Ne of the engine 22 based on the crank angle θcr from the crank position sensor 23. The engine ECU 40 computes a load factor (the ratio of the volume of air that is actually taken in per one cycle to a piston displacement per one cycle of the engine 22) KL based on an intake air volume Qa from an air flow meter (not shown) and the rotation speed Ne of the engine 22.

Although not shown in the drawing, the noise detection ECU 50 is configured as a microprocessor that mainly includes a CPU and that, in addition to the CPU, further includes ROM that stores process programs, RAM that temporarily stores data, input and output ports, and a communication port. Signals from various sensors are input to the noise detection ECU 50 via the input port. Examples of signals that are input to the noise detection ECU 50 include a detected sound Ser from the sound sensor 52.

In the thus configured noise detection system 10 of the embodiment, the engine ECU 40 executes intake air volume control for controlling the opening degree of the throttle valve (not shown), fuel injection control for controlling a fuel injection amount from the fuel injection valve (not shown), ignition control for controlling the ignition timing of the ignition plug (not shown), and the like based on a required load factor KL* of the engine 22.

Figure 2:
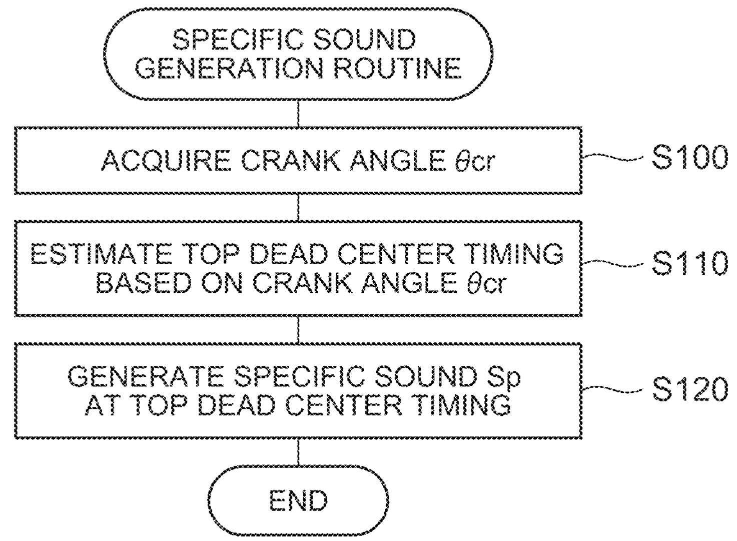
FIG. 2 is a flowchart showing an example of a specific sound generation routine executed by an engine ECU.

Next, the operation of the thus configured noise detection system 10 of the embodiment, particularly, the operation at the time of causing the speaker 34 to generate a specific sound Sp, will be described. FIG. 2 is a flowchart showing an example of a specific sound generation routine executed by the engine ECU 40. This routine is repeatedly executed when detection of a noise of the engine 22 is required.

When the specific sound generation routine of FIG. 2 is executed, the engine ECU 40 initially acquires data such as a crank angle θcr (step S100). Here, a detected value of the crank position sensor 23 is input as the crank angle θcr.

After data is input in this way, the timing of a top dead center of a specific cylinder of the engine 22 is estimated based on the input crank angle θcr (step S110). Here, the specific cylinder is a reference cylinder among a plurality of cylinders (for example, four cylinders) of the engine 22. Thus, a specific sound Sp is generated at timing appropriate for a noise determination routine (described later).

After the timing of the top dead center is estimated, the speaker 34 is controlled so as to generate a specific sound (for example, a pulsed sound) Sp in synchronization with the estimated timing of the top dead center (step S120), and the routine is ended. Here, a specific sound Sp is set to have a frequency fsp that is higher than the operation sound of the engine 22 or the audible frequency range (for example, higher than or equal to 20000 Hz) and that does not interfere with another device in the engine compartment 30 (in the case of a hybrid automobile, for example, an inverter). With this configuration, it is possible to reduce a situation in which a specific sound Sp makes a user (for example, a driver of the vehicle, a worker who inspects the engine 22 or other devices, or the like).

Figure 3:
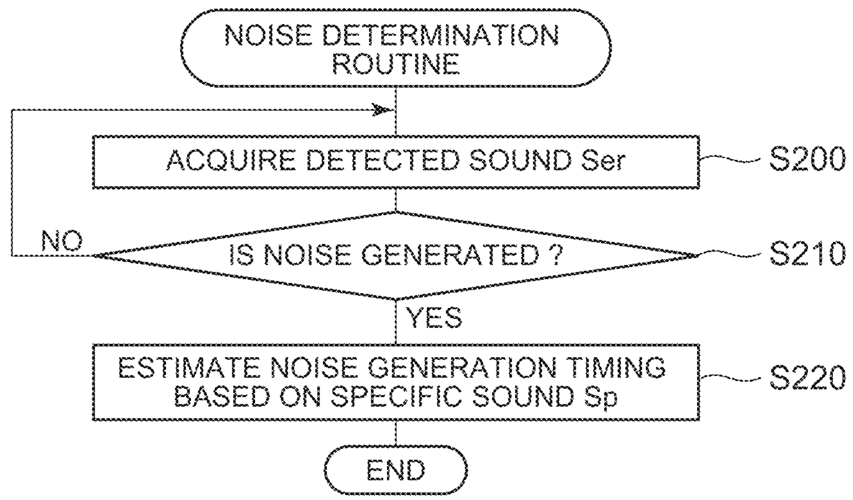
FIG. 3 is a flowchart showing an example of a noise determination routine executed by a noise detection ECU.

Next, the operation at the time of detecting a noise generated from the engine 22 will be described. FIG. 3 is a flowchart showing an example of the noise determination routine executed by the noise detection ECU 50. This routine is repeatedly executed when detection of a noise of the engine 22 is required.

When the noise determination routine of FIG. 3 is executed, the noise detection ECU 50 initially acquires data such as a detected sound Ser (step S200). Here, a detected value of the sound sensor 52 is input as the detected sound Ser.

After data is input in this way, it is determined whether a noise is generated from the engine 22 (step S210). This determination may be performed based on, for example, whether the detected sound Ser includes components having a frequency higher than or equal to a threshold fref1 and lower than or equal to a threshold fref2. Here, the thresholds fref1, fref2 are respectively a lower limit threshold and an upper limit threshold of a frequency for detecting a noise of the engine 22. The threshold fref1 is determined by experiment or analysis as a value higher than the operation sound of the engine 22 during normal times and lower than the specific sound Sp. The threshold fref2 is determined by experiment or analysis as a value higher than the threshold fref1 and lower than the specific sound Sp. When no noise is generated from the engine 22, the process returns to step 100.

When a noise is generated from the engine 22 in step S210, timing at which a noise is generated from the engine 22 (a crank angle of the engine 22 at the time when a noise is generated) is estimated based on the specific sound Sp generated by the speaker 34 (step S220), and the routine is ended. Because the specific sound Sp is generated by the above-described specific sound generation routine in synchronization with the timing of the top dead center of the specific cylinder of the engine 22, this estimation is able to be made based on a deviation in time between the generated timing of a noise from the engine 22, included in the detected sound Ser, and the generated timing of the specific sound Sp. Through the thus configured process, it is possible to estimate the timing of a noise from the engine 22 without directly using a crank angle θcr (a signal from the crank position sensor 23) of the engine 22.

Figure 4:
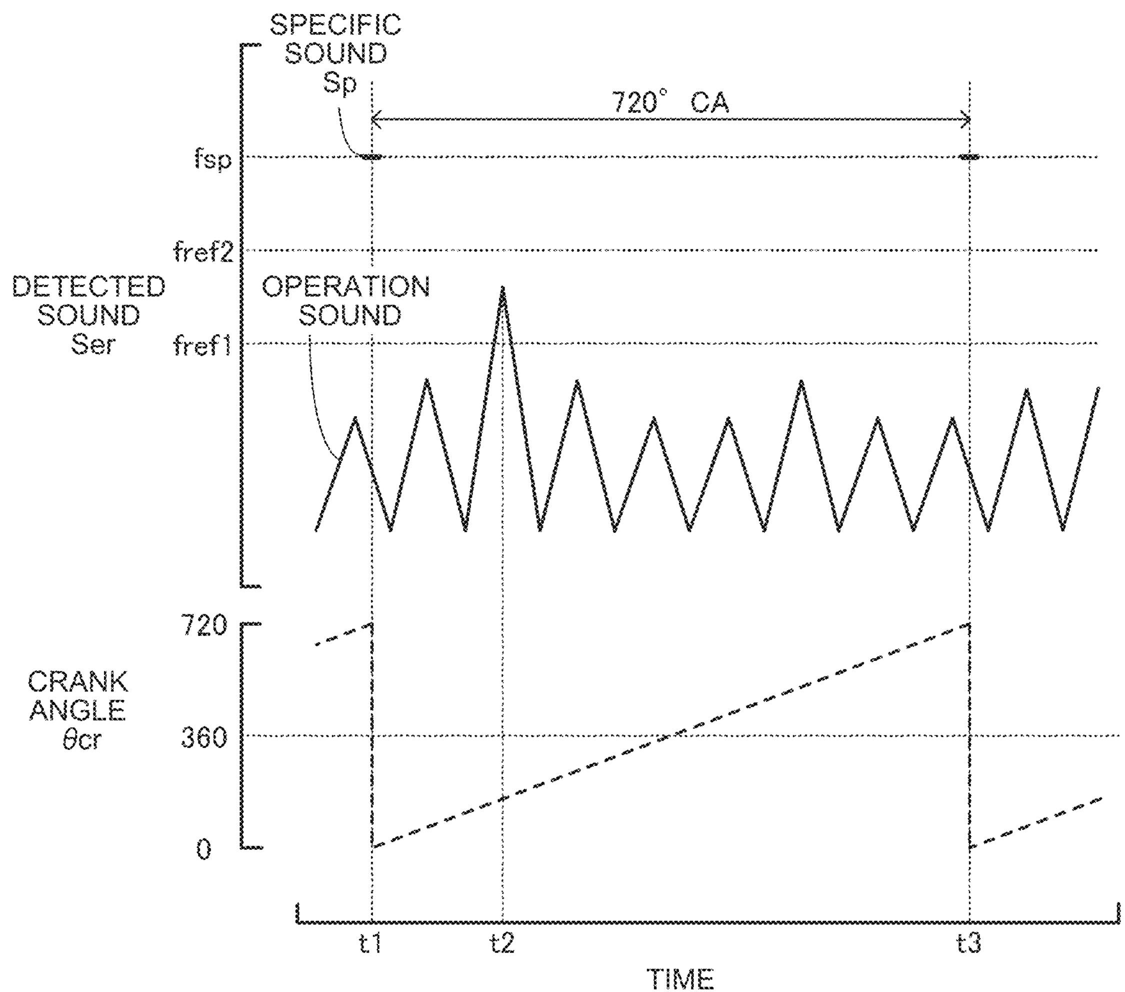
FIG. 4 is a timing chart showing an example of temporal changes in detected sound and crank angle.

FIG. 4 is a timing chart showing an example of temporal changes in detected sound Ser and crank angle θcr. In the chart, an upper limit value of a bandwidth is shown for the operation sound of the engine 22, included in the detected sound Ser. As shown in the chart, when the top dead center of the specific cylinder of the engine 22 comes (time t1, time t3), the speaker 34 generates a specific sound Sp having a frequency fsp (for example, higher than or equal to 20000 Hz). On the other hand, when the frequency of the operation sound of the engine 22 becomes higher than or equal to the threshold fref1 and lower than or equal to the threshold fref2 (when the frequency of the operation sound of the engine 22 includes components in this frequency range) (time t2), it is determined that a noise is generated from the engine 22. Then, a crank angle at the time when a noise is generated from the engine 22 can be estimated based on a deviation in time between the timing (time t2) at which a noise is generated from the engine 22 and the generated timing (time t1) of the specific sound Sp. In other words, it is possible to estimate the timing of a noise from the engine 22 without directly using the crank angle θcr of the engine 22.

With the engine apparatus 20 of the above-described embodiment, a specific sound Sp having a higher frequency than the operation sound of the engine 22 is generated in synchronization with the timing of the top dead center of the specific cylinder of the engine 22. Thus, the timing of a noise from the engine 22 is estimated by using, for example, a deviation in time between the generated timing of a specific sound Sp and the timing at which a noise is generated from the engine 22, based on a sound collected from around the engine 22 (in the engine compartment 30) without directly using a signal of a crank angle θcr of the engine 22.

In the engine apparatus 20 of the embodiment, a specific sound Sp is generated when one specific cylinder of the plurality of cylinders of the engine 22 reaches a top dead center. Alternatively, a specific sound Sp may be generated when any one of a plurality of specific cylinders of the plurality of cylinders of the engine 22 reaches a top dead center. In this case, it is desirable that specific sounds Sp having different frequencies be generated respectively for the plurality of specific cylinders.

In the engine apparatus 20 of the embodiment, a frequency higher than or equal to 20000 Hz is used for the specific sound Sp. However, a frequency higher than the operation sound of the engine 22 to some extent is applicable, and a frequency lower than 20000 Hz may also be used for the specific sound Sp.

In the noise detection system 10 of the embodiment, the engine apparatus 20 includes the noise detection ECU 50 and the sound sensor 52. Alternatively, an external device (for example, a smartphone) may include the noise detection ECU 50 and the sound sensor 52.

The noise detection system 10 of the embodiment includes the engine ECU 40 and the noise detection ECU 50. Alternatively, the engine ECU 40 and the noise detection ECU 50 may be integrated. In this case, as in the case of the embodiment, it is possible to estimate the timing of a noise from the engine 22 without directly using a signal of the crank angle θcr of the engine 22.

The correspondence relation between major elements of the embodiment and major elements of the present disclosure described in Summary will be described. In the embodiment, the speaker 34 and the engine ECU 40 correspond to a specific sound generator. The sound sensor 52 corresponds to a sound collector. The noise detection ECU 50 corresponds to an estimator.

The correspondence relation between major elements of the embodiment and major elements of the present disclosure described in Summary does not limit the elements of the present disclosure described in the Summary since the embodiment is an example for specifically describing the aspects of the present disclosure described in the Summary. In other words, the present disclosure described in the Summary should be interpreted based on the description therein, and the embodiment is only a specific example of the present disclosure described in the Summary.

The embodiment of the present disclosure is described above; however, the applicable embodiment is not limited to the embodiment and may be, of course, modified into various forms without departing from the scope of the present disclosure.

The present disclosure is usable in the industry of manufacturing engine apparatuses and noise detection systems.

What is claimed is:

1. A noise detection system, comprising:

an engine apparatus comprising:

an engine accommodated in an engine compartment of a vehicle; and a specific sound generator disposed in the engine compartment or attached to a wall part of the engine compartment, the specific sound generator configured to generate a specific sound having a frequency higher than an operation sound of the engine in synchronization with timing of a top dead center of a specific cylinder of the engine;

a sound collector configured to collect a sound including the specific sound in the engine compartment; and an estimator configured to estimate presence or absence and timing of generation of a noise based on the sound collected by the sound collector, wherein the estimator is configured to estimate a crank angle of the engine at a time when a noise occurs in the engine, based on a deviation in time between a timing of the noise occurring in the engine and a further timing of the specific sound collected by the sound collector.

2. The noise detection system according to claim 1, wherein the specific sound has the frequency higher than or equal to 20000 Hz.

3. The noise detection system according to claim 1, further comprising:

a crank angle sensor configured to detect the crank angle of the engine, wherein:

the specific sound generator is configured to estimate the timing of the top dead center of the specific cylinder based on the detected crank angle; and the specific sound generator is configured to generate the specific sound in synchronization with the timing of the top dead center of the specific cylinder.

* * * * *